United States Patent Office 3,649,643
Patented Mar. 14, 1972

3,649,643
N-PHTHALIMIDOACETYL-5-CHLORO-2-CYCLO-
PROPYL-METHYLAMINOBENZHYDROL
Robert M. Novack, Mendham, N.J., assignor to Warner-
Lambert Company, Morris Plains, N.J.
No Drawing. Filed Mar. 10, 1969, Ser. No. 805,894
Int. Cl. C07d 27/52
U.S. Cl. 260—326 N 5 Claims

ABSTRACT OF THE DISCLOSURE

There is described N-phthalimidoacetyl - 5 - chloro-2-cyclopropylmethylaminobenzhydrol; a process for producing said compound; and a method for converting same into N-phthalimidoacetyl - 5 - chloro - 2 - cyclopropyl-methylaminobenzophenone. The benzhydrol compound of this invention is prepared by reacting 5-chloro-2-cyclopropylmethylaminobenzhydrol with phthalimidoacetyl chloride in the presence of an alkali at a temperature below normal room temperatures. It is converted to the aforementioned known benzophenone by reaction with an aqueous acetic acid solution of chromium trioxide.

N - phthalimidoacetyl - 5 - chloro - 2 - cyclopropyl-methylaminobenzhydrol is useful, and it is used, as the penultimate intermediate in a process for the preparation of 1-cyclopropylmethyl - 5 - phenyl - 7 - chloro - 1H - 1,4-benzodiazepine-2(3H)-one. The novel benzhydrol compound is converted into the corresponding benzophenone and the latter, in turn, is converted into the benzodiazepine compound. The aforementioned benzodiazepine compound is a known tranquilizer, exhibiting anti-anxiety and sedative activity without undesirable side effects such as hypnosis.

BRIEF SUMMARY OF THE INVENTION

N - phthalimidoacetyl - 5 - chloro - 2 - cyclopropyl-methylaminobenzhydrol is prepared by the steps of (1) dissolving 5-chloro - 2 - cyclopropylmethylaminobenz-hydrol in an inert organic solvent, (2) treating the solution, thus obtained, with an aqueous alkali solution and (3) subsequently adding a solution of phthalimidoacetyl chloride in an inert organic solvent. After stirring for a short period of time at a reduced temperature, N-phthalimidoacetyl - 5 - chloro - 2 - cyclopropylmethylamino-benzhydrol commences to precipitate out of solution. The product is then recovered by filtration and, if desired, it can be further purified by conventional crystallization procedures.

N - phthalimidoacetyl - 5 - chloro - 2 - cyclopropyl-methylaminobenzhydrol is converted into N - phthalimido-acetyl - 5 - chloro - 2 - cyclopropylmethylaminobenzo-phenone, the immediate precursor of 1 - cyclopropylmethyl - 5 - phenyl - 7 - chloro - 1H - 1,4 - benzodiazepine-2(3H)-one, by its reaction with an aqueous acetic acid solution of chromium trioxide.

BACKGROUND OF THE INVENTION

U.S. Pat. 3,284,503, issued Nov. 8, 1966, discloses a five-step procedure for the production of 1-cyclopropyl-methyl - 5 - phenyl - 7 - chloro - 1H - 1,4 - benzodi-azepine-2(3H)-one. In Step IV of that process, 2-cyclo-propylmethylamino - 5 - chlorobenzophenone, obtained by the oxidation of 2-cyclopropylmethylamino-5-chlorobenz-hydrol with an excess of manganese dioxide, is refluxed in tetrahydrofuran with phthalimidoacetyl chloride to produce 2(N - phthalimidoacetyl - N - cyclopropylmethyl)-amino-5-chlorobenzophenone. In Step V of the process of U.S. Pat. 3,284,503, the benzophenone product of Step IV is reacted, in a mixture of chloroform and ethanol, with an excess of hydrazine hydrate to produce the physiologically active 1-cyclopropylmethyl-5-phenyl-7-chloro-1H-1,4-benzodiazepine-2(3H)-one.

The present invention provides an alternate and improved method for producing 1 - cyclopropylmethyl - 5 - phenyl-7-chloro - 1H - 1,4 - benzodiazepine - 2(3H)-one. The method involves the preparation of the novel intermediate N - phthalimidoacetyl - 5 - chloro - 2 - cyclopropylmethylaminobenzhydrol of this invention, its conversion to the corresponding benzophenone and the conversion of the latter, by known procedures, to the physiologically active benzodiazepine compound.

DETAILED DESCRIPTION

In the first step of the process for producing N-phthalimidoacetyl - 5 - chloro - 2 - cyclopropylmethylamino-benzhydrol, 5 - chloro - 2 - cyclopropylmethylamino-benzhydrol is dissolved in an inert organic solvent. In general, any organic liquid, which is a solvent for 5-chloro-2-cyclopropylmethylaminobenzhydrol and which is inert under the reaction conditions employed in this process, can be employed as the solvent. Solvents which are particularly well suited for use include benzene, toluene, xylene, etc. In the preferred embodiment, however, a solution of 5 - chloro - 2 - cyclopropylmethylaminobenzhydrol in toluene is employed. The solution can be prepared simply by mixing the benzhydrol compound in the solvent at room temperature. However, dissolution of the benzhydrol compound in the solvent can be facilitated by heating the solvent to a temperature elevated somewhat above room temperature. The quantity of solvent which is used in this step of the process is not particularly critical. Obviously, however, the amount employed should be sufficient to dissolve completely the benzhydrol starting material in use. Generally, however, a ratio of from about 3 to 5 parts by volume will be employed for each part by weight of the benzhydrol compound in use.

In the next step of the preparative method, the organic solvent solution of the benzhydrol compound is cooled to a temperature within the range of from about 10° C. to about 30° C., with constant stirring. In the preferred embodiment of the invention, the solution is cooled to a temperature within the range of from about 12° C. to about 18° C. Subsequently, an aqueous alkali solution is slowly added to the organic solvent solution of the benzhydrol compound. During the addition of the alkali solution, the temperature of the benzhydrol solution is maintained within the range of from about 10° C. to about 30° C. and, preferably within the range of from about 12° C. to about 18° C. The practice of this invention is not limited by the identity of the alkali used. In general, any water-soluble inorganic alkali can be employed. Thus, for example, suitable for use are water-soluble alkali metal hydroxides, such as, sodium hydroxide, potassium hydroxide, etc. and alkali metal carbonates, such as, sodium carbonate, potassium carbonate, etc. The quantity of alkali used is variable. Generally, however, from about 1.0 mole to about 1.3 moles of alkali will be used for each 1.0 mole of phthalimidoacetyl chloride to be employed.

For use in the next step of the process, a solution of phthalimidoacetyl chloride is first prepared. In producing such solution there can be used any organic liquid which is a solvent for phthalimidoacetyl chloride and which is inert under the reaction conditions employed. Especially well suited for use, however, are benzene, toluene, xylene, etc. A solution of phthalimidoacetyl chloride in toluene is used in the preferred embodiment of the invention. The concentration of the solution, thus produced, is not particularly critical. The amount of solvent employed should be sufficient at least to dissolve completely all of the phthalimidoacetyl chloride in use. As a general rule, however, there will be employed from about 1.5 to 3.0 parts by volume of solvent for each part by weight of phthalimidoacetyl chloride in use. The solution, thus prepared, is slowly added to the alkaline benzhydrol solution, produced in the preceding step. Throughout the addition, the reaction mixture is stirred continuously and it is maintained at a temperature within the range of from about 10° C. to about 30° C. In the preferred embodiment of the invention, the temperature of the reaction mixture is maintained within the range of from about 15° C. to about 25° C. The quantity of phthalimidoacetyl chloride which is employed is variable. In general, however, a sufficient quantity will be used to provide a ratio of from about 1.0 mole to 1.3 moles of phthalimidoacetyl chloride for each mole of benzhydrol compound present in the reaction mixture. After a short period of time, precipitation of N-phthalimidoacetyl - 5 - chloro - 2 - cyclopropylmethylaminobenzhydrol commences. Stirring of the cooled reaction mixture is continued until precipitation of the product is completed. Thereafter, the reaction mixture is filtered to recover the precipitate. The product is then washed first with water and subsequently with an inert organic solvent, for example, benzene, toluene xylene. The washed product is, thereafter, dried under vacuum.

The mother liquor, i.e. the two phase water-organic solvent system obtained when the precipitate was recovered from the reaction mixture by filtration, alone or in admixture with the organic solvent used in washing the filter cake, can be further treated to recover additional quantities of the product. This is accomplished by first treating the mother liquor to separate the organic layer from the aqueous layer. The water layer is discarded. Thereafter, the organic solvent, which may or may not be combined with the solvent used in the washing step, is cooled to a temperature within the range of from about 5° C. to about 15° C. and maintained at that temperature for an extended period of time, for example, for a period of twenty-four hours or longer. Any portion of the product not previously removed will be caused to precipitate out of solution. When the precipitation appears to be complete, the precipitate is recovered by filtration, following which it is washed and dried as described heretofore. The product, thus obtained, can be re-crystallized from a suitable solvent, for example, acetonitrile, if desired or if necessary, to obtain a product of higher purity.

The 5 - chloro - 2 - cyclopropylmethylaminobenzhydrol, which is used as the starting material in the practice of the present invention, is a known compound. It is produced, for example, by the reduction of 2-cyclopropylcarbonylamido - 5 - chlorobenzophenone with an excess of a reducing agent, such as, lithium aluminum hydride, followed by aqueous hydrolysis. A process for the production of this compound is described in full detail in U.S. Pat. 3,284,503.

As indicated heretofore, the N - phthalimidoacetyl - 5-chloro - 2 - cyclopropylmethylaminobenzhydrol of this invention is used as an intermediate in the process for the preparation of 1 - cyclopropylmethyl-5-phenyl-7-chloro-1H-1,4-benzodiazepine-2(3H)-one. The latter compound, and its use as a tranquilizer, is disclosed in U.S. Pat. 3,284,503. The precise manner in which N-phthalimidoacetyl - 5 - chloro - 2 - cyclopropylmethylaminobenzhydrol is converted to the benzophenone compound will be described in the working examples set forth hereinafter. In general, however, the preparative method involves two steps. In the first step, which is part of the present invention, N-phthalimidoacetyl - 5 - chloro - 2-cyclopropylmethylaminobenzhydrol is converted into the known N-phthalimidoacetyl - 5 - chloro - 2 - cyclopropylmethylaminobenzophenone and, in the second step, the latter is converted, by a known method, into 1-cyclopropylmethyl - 5 - phenyl - 7 - chloro - 1H -1,4 - benzodiazepine - 2(3H) - one. The first step involves treating N-phthalimidoacetyl - 5 - chloro - 2 - cyclopropylmethylaminobenzhydrol with a solution of chromium trioxide in aqueous acetic acid at a temperature below room temperature. As used herein, the expression "aqueous acetic acid" denotes a mixture of acetic acid and from about 1% to about 5% by volume of water. Varying quantities of acetic acid and chromium trioxide can be used. As a general rule, however, there will be provided from about 2.0 to 4.0 parts by volume of acetic acid for each part by weight of benzhydrol compound and from about 1.0 mole to about 1.3 moles of chromium trioxide for each mole of benzhydrol compound present in the reaction mixture. After a short period of time, for example, from 15 to 60 minutes, the reaction mixture is heated slowly to, and maintained at, a temperature of about 60° C. Water is then added to the reaction mixture with the temperature being maintained above about 50° C. Upon continued heating, the reaction mixture becomes thick and, at that point in the process, the mixture is cooled to a temperature within the range of from about 10° C. to about 50° C. The reaction mixture is then filtered, and the collected product is washed with water until neutral and dried, under vacuum, at a temperature not above about 60° C. The product, thus obtained, is N - phthalimidoacetyl - 5 - chloro-2-cyclopropylmethylaminobenzophenone. The benzophenone product is readily converted into 1 - cyclopropylmethyl - 5 - phenyl - 7 - chloro - 1H - 1,4 - benzodiazepine-2(3H)-one by the method described in U.S. Pat. 3,284,503.

For a fuller understanding of the nature and objects of this invention, reference may be had to the following examples which are given merely as further illustrations of the invention and are not to be construed in a limiting sense.

EXAMPLE 1

Preparation of N-phthalimidoacetyl-5-chloro-2-cyclopropylmethylaminobenzhydrol

In this example, 9 kg. (31.2 moles) of 5-chloro-2-cyclopropylmethylaminobenzhydrol and 38.8 liters of toluene were charged into a suitable vessel and heated to a temperature slightly above room temperature. The solution, thus obtained, was cooled, with stirring, to a temperature of about 15° C. and, at that temperature, a solution of 1.7 kg. (42.5 moles) of sodium hydroxide in 5.8 liters of water was added. The aqueous sodium hydroxide solution was introduced into the reaction vessel slowly, i.e. over a period of about 15 minutes, with the temperature of the mixture being maintained at about 15° C. When the addition of the sodium hydroxide was completed, a solution of 8.64 kg. (38.7 moles) of phthalimidoacetyl chloride in 19 liters of toluene was slowly added. This addition was carried out over a period of about 90 minutes, with the internal temperautre of the mixture being maintained within the range of from about 18° C. to about 20° C. During this addition, the product commenced to come out of solution in the form of a precipitate. When the addition was completed, the reaction mixture was stirred, at a temperature within the range of from about 18° C. to about 20° C., for an additional 60 minutes period. At the end of that time, the reaction mixture was filtered on a ceramic filter over cloth. The filter cake was then washed first with 4 gallons of water and subsequently with 1 gallon of toluene. The washed filter cake was then dried in a vacuum oven at a temperature of from about 60° C. to about 70° C. under 27 inches of vacuum. There was, thus obtained, 10.4 kg. of N-phthalimidoacetyl-5-chloro-2-cyclopropylmethylaminobenzhydrol, melting point at 140.5° C. to 143° C.

The toluene layer was separated from the toluene-water mother liquor, obtained in the filtration step described in the preceding paragraph. The water layer was discarded. The toluene liquor was cooled to a temperature of 10° C. and it was maintained at that temperature for a period of about twenty-four hours. An additional yield of product came out of solution in the form of a precipitate. The precipitate was, thereafter, recovered by filtration, and the filter cake was washed and dried, as described in the preceding paragraph. In this manner, there was obtained an additional 2 kg. of N-phthalimidacetyl-5-chloro-2-cyclopropylmethylaminobenzhydrol, melting point at 135° C. to 137° C. Crystallization of this compound from acetonitrile, using 2 parts by weight of acetonitrile for each part by weight of the compound, yielded 1.7 kg. of N-phthalimidoacetyl - 5 - chloro - 2 - cyclopropylmethylaminobenzhydrol, melting point at 140.5° C. to 145° C.

The total yield of product, namely, 12.1 kg. represented 81% of theory.

EXAMPLE 2

This example is included herein to demonstrate the manner in which N-phthalimidoacetyl-5-chloro-2-cyclopropylmethylaminobenzhydrol is converted into N-phthalimidoacetyl-5-chloro-2-cyclopropylmethylaminobenzophenone.

In this example, 2.78 kg. (27.8 moles) of chromium trioxide were added to a solution of 31.9 liters of acetic acid and 638 ml. of water at a temperature of about 20° C. The mixture was stirred at that temperature for a period of about 30 minutes, following which, over a period of about 40 minutes and at a temperature of from about 18° C. to about 20° C., 12 kg. (25.3 moles) of N-phthalimidoacetyl-5-chloro-2-cyclopropylmethylaminobenzhydrol was added. When the addition of the benzhydrol compound was completed, the reaction mixture was heated slowly to a temperature of about 60° C. The reaction mixture was maintained at that temperature for a period of about one hour. At the end of that period of time, 65.4 liters of water were added with the temperature of the reaction mixture being maintained above about 50° C. The reaction mixture became thick with solids and, at that point, it was cooled to a temperature of about 12° C. The mixture was then filtered on a ceramic filter over cloth and the filter cake was washed with water until the washings were neutral. The washed product was dried in a vacuum oven at a temperature of about 60° C. and about 27 inches of vacuum. There was, thus obtained, 11.5 kg. (96% of theory) of N-phthalimidoacetyl-5-chloro - 2-cyclopropylmethylaminobenzophenone, melting point at 159° C. to 162° C.

The reaction product, namely, N-phthalimidoacetyl-5-chloro-2-cyclopropylmethylaminobenzophenone was converted into 1-cyclopropylmethyl-5-phenyl-7-chloro-1H-1,4-benzodiazepine-2(3H)-one, melting point at 145° C. to 146° C. by the procedure described in Example V of U.S. Pat. 3,284,503.

Having described my invention, what I desire to secure by Letters Patent is:

1. N-phthalimidoacetyl - 5 - chloro-2-cyclopropylmethylaminobenzhydrol.

2. A process for producing N-phthalimidoacetyl-5-chloro-2-cyclopropylmethylaminobenzhydrol which comprises reacting 5-chloro-2-cyclopropylmethylaminobenzhydrol with phthalimidoacetyl chloride in the presence of an aqueous alkali at a temperature within the range of from about 10° C. to 30° C., said reaction being carried out in an inert organic liquid which is a solvent for said 5-chloro-2-cyclopropylmethylaminobenzhydrol and said phthalimidoacetyl chloride.

3. The process of claim 2 wherein the reaction is carried out at a temperature within the range of from about 12° C. to about 18° C.

4. The process of claim 3 wherein the process is carried out in the presence of an aqueous solution of an alkali metal hydroxide.

5. The process of claim 4 wherein the alkali metal hydroxide is sodium hydroxide.

References Cited
UNITED STATES PATENTS

| | | | |
|---|---|---|---|
| 2,498,665 | 2/1950 | Emerson | 260—112 |
| 3,192,199 | 6/1965 | McMillan | 260—239.3 |

ALEX MAZEL, Primary Examiner

J. A. NARCAVAGE, Assistant Examiner

U.S. Cl. X.R.
260—239.3 D, 999